(12) United States Patent
Hoogland et al.

(10) Patent No.: US 7,149,015 B2
(45) Date of Patent: Dec. 12, 2006

(54) OBLIQUITY CORRECTION SCANNING USING A PRISM MIRROR

(75) Inventors: Jan Hoogland, Honolulu, HI (US); Curtis A. Shuman, Colorado Springs, CO (US)

(73) Assignees: InPhase Technologies, Inc., Longmont, CO (US); Sanyo Electric Co., Ltd., Moriguchi (JP)

(*) Notice: Subject to any disclaimer, the term of this patent is extended or adjusted under 35 U.S.C. 154(b) by 127 days.

(21) Appl. No.: 10/751,871

(22) Filed: Jan. 5, 2004

(65) Prior Publication Data

US 2005/0146762 A1 Jul. 7, 2005

(51) Int. Cl.
*G03H 1/04* (2006.01)

(52) U.S. Cl. .............. 359/35; 359/30; 359/24; 359/25; 359/196; 359/833; 365/125; 365/216; 365/234

(58) Field of Classification Search .......... 359/24–25, 359/30, 35, 196, 833, 837; 365/125, 216, 365/234
See application file for complete search history.

(56) References Cited

U.S. PATENT DOCUMENTS

| | | | |
|---|---|---|---|
| 5,640,257 A * | 6/1997 | Clube | 359/30 |
| 6,103,454 A | 8/2000 | Dhar et al. | |
| 6,185,056 B1 * | 2/2001 | Nishiwaki et al. | 359/837 |
| 6,775,037 B1 * | 8/2004 | Lee | 359/35 |
| 2003/0123116 A1 | 7/2003 | Shuman | |
| 2003/0189740 A1 | 10/2003 | Hoogland et al. | |

FOREIGN PATENT DOCUMENTS

EP 0400502 A2 * 12/1990

OTHER PUBLICATIONS

S.Redfield, "Tamarack optical head holographic storage", in Holographic Data Storage, H.J. Coufal et. al., eds, Springer-Verlang, pp. 350-351 (2000).*
Dhar, L. et al. (2000). "Photopolymers for Digital Holographic Storage" In *Holographic Data Storage* Coufal, H.J. et al. eds. Springer-Verlag: Berlin, Germany pp. 199-207.
Pepper, D.M. et al. (1990). "The Photorefractive Effect," *Scientific American* pp. 62-74.
Redfield, S. (2000). "Tamarack Optical Head Holographic Storage," In *Holographic Data Storage* Coufal, H.J. et al. eds. Springer-Verlag: Berlin, Germany pp. 343-357.

* cited by examiner

*Primary Examiner*—Leonidas Boutsikaris
(74) *Attorney, Agent, or Firm*—Morrison & Foerster LLP

(57) ABSTRACT

Disclosed are optical systems and methods of producing obliquity corrected light beams, for example, holographic recording and retrieval systems that utilize an obliquity corrected reference beam. One method includes directing a light beam reflected from a prism mirror to a reference plane with an angle of incidence to the reference plane, wherein the prism mirror varies the width of the light beam according to the angle of incidence to the reference plane. The optical system may include a holographic data storage system and the reference plane may be associated with a holographic storage medium.

26 Claims, 6 Drawing Sheets

OBLIQUITY CORRECTION SCANNING USING A PRISM MIRROR

BACKGROUND

1. Field

The present invention relates generally to optical systems for correcting the variation of an area exposed by a light beam due to the obliquity of the light beam, and more specifically this invention relates to optical systems, e.g., holographic data storage systems, that decrease the width of a light beam as the obliquity of the light beam increases.

2. Related Art

Many optical systems and applications vary the angle of incidence of light beams with respect to a plane or surface and vary the width of the light beams to maintain a substantially uniform area or footprint of the light beam with respect to the plane or surface. For instance, various optical systems and applications such as holographic data storage systems, laser processing systems, material property measurement systems, and the like, desirably maintain a substantially uniform footprint area over various angles of incidence.

Holographic data storage systems, for example, store information or data based on the concept of a signal beam interfering with a reference beam at various angles with respect to a holographic storage medium. The interference of the signal beam and the reference beam creates a holographic representation, i.e., a hologram, of data elements as a pattern of varying refractive index and/or absorption imprinted in a volume of a storage or recording medium such as a photopolymer or photorefractive crystal. Combining a data-encoded signal beam, referred to as an object beam, with a reference beam can create the interference pattern at the storage medium. A spatial light modulator (SLM) or lithographic data mask, for example, may create the data-encoded signal beam. The interference pattern induces material alterations in the storage medium that generate the hologram. The formation of the hologram in the storage medium is generally a function of the relative amplitudes and polarization states of, and phase differences between, the signal beam and the reference beam. The hologram is also dependent on the wavelengths and angles at which the signal beam and the reference beam are projected into the storage medium. After a hologram is created in the storage medium, projecting the reference beam into the storage medium interacts and reconstructs the original data-encoded signal beam. The reconstructed signal beam may be detected with a detector, such as a CMOS photo-detector array or the like. The recovered data may then be decoded by the photo-detector array into the original encoded data.

A holographic storage medium may include a variety of materials and take a variety of forms. For example, it may include a film containing dispersed silver halide particles, photosensitive polymer films ("photopolymers") or a freestanding crystal such as iron-doped LiNbO$_3$ crystal. U.S. Pat. No. 6,103,454, entitled RECORDING MEDIUM AND PROCESS FOR FORMING MEDIUM, generally describes several types of photopolymers suitable for use in holographic storage media.

FIG. 1 illustrates the basic components of an exemplary holographic storage system 10. System 10 contains an SLM 12, a holographic storage medium 14, and a sensor 16. SLM 12 encodes beam 20 with an object image. The image is stored by interfering the encoded data beam 20 with a reference beam 22 at a location on or within holographic storage medium 14. The interference creates an interference pattern (or hologram) that is captured within medium 14 as a pattern of, for example, a holographic refractive index grating.

To increase the storage capacity of holographic storage media, more than one holographic image may be stored at a single location, or for holograms to be stored in overlapping positions, by, for example, varying the angle, the wavelength, or the phase of the reference beam 22, depending on the particular reference beam employed. Data beam 20 typically passes through lenses 30 before being intersected with reference beam 22 in the medium 14. It is possible for reference beam 22 to pass through lenses 32 before this intersection. Once data is stored in medium 14, it is possible to retrieve the data by intersecting a reference beam 22 with medium 14 at the same location and at the same angle, wavelength, or phase at which a reference beam 22 was directed during storage of the data. The reconstructed data beam passes through one or more lenses 34 and is detected by sensor 16. Sensor 16, is for example, a charged coupled device or an active pixel sensor.

Multiple images or data pages of information may be stored in the same volume by varying the angle of the reference beam 22 during recording. This process is generally referred to as angle multiplexing, where successive images are recorded in the same volume using varying reference beam 22 angles. Varying the angle of reference beam 22 over a wide range of angles with respect to the volume increases the number of images or data to be stored in the volume.

Varying the angle of the reference beam 22, however, increases the area of the holographic storage medium 14 exposed by reference beam 22. The area of holographic storage medium 14 exposed by reference beam 22 depends upon the angle of incidence of reference beam 22 with respect to the surface of holographic storage medium 14 ("the obliquity"), and the width of reference beam 22. The area exposed by reference beam 22 is related to the capacity of the holographic storage medium 14 to store data; generally, a larger area exposed by reference beam 22 results in a reduction in the capacity of the holographic storage medium 14 per unit volume. Accordingly, it is generally desired to maintain a substantially uniform area as the angle of incidence varies.

Obliquity has been corrected in optical systems, including holographic data storage systems, with the use of a complex set of stationary prisms and optical elements (see, e.g., Coufal et al., "Tamarack Optical Head Holographic Storage" in Holographic Data Storage, 343–357 (2000)). FIG. 2 shows an exemplary obliquity correction system using two prisms 226 and 228 and three lens components 230, 232, and 234. In FIG. 2, light beams 224 are reflected off of scanning mirror 222 to first prism 226. The light beams exiting first prism 226 proceed to second prism 228 and through lens components 230, 232, and 234 to a surface 236. The width of the reference beam decreases as the angle of the reference beam with respect to the normal of surface 236 increases.

BRIEF SUMMARY OF THE INVENTION

Disclosed are methods and systems for producing obliquity corrected light beams, and holographic recording and retrieval systems that utilize an obliquity corrected reference beam.

In one aspect and one example, a method of producing an obliquity corrected light beam is provided. The method includes directing a light beam to a prism mirror and directing the reflected beam from the prism mirror to a reference plane with an angle of incidence to the reference plane, wherein the prism mirror varies the width of the light beam according to the angle of incidence to the reference plane.

In another aspect, a method for scanning multiple light beams is provided. In one example the method includes directing a first light beam to a prism mirror at a first angle to the prism mirror, and directing a second light beam to the prism mirror at a second angle to the prism mirror. The width of the first light beam and the second light beam are varied by the prism mirror according to the first angle and the second angle to the prism mirror. Additionally, the first light beam is reflected from the prism mirror to a reference plane at a first angle of incidence, and the second light beam is reflected from the prism mirror to the reference plane at a second angle of incidence, where the first angle of incidence and the second angle of incidence to the reference plane are associated with the width of the first light beam and the second light beam.

The exemplary methods and systems may include various other aspects. The prism mirror may rotate to vary the width of a light beam as the angle of incidence of the light beam varies. Alternatively, a scanning mirror may be rotated to vary the angle of incidence of the light beam. The prism mirror may further be coupled to an optical relay system including, e.g., curved optics and/or prisms. The optical relay system may include a symmetrical or unsymmetrical 4F lens configuration. Further, the optical relay system may include an aspheric scan lens.

In another aspect and another example, a holographic data storage system for reading and/or writing to a holographic storage medium is provided. In one example, the system includes a light source and a prism mirror, wherein the light source is configured to project a light beam that reflects from the prism mirror and is incident to a reference plane, and the prism mirror varies the width of the light beam as the angle of incidence to the reference plane varies. The reference plane may be associated with a holographic storage medium.

In yet another aspect and example, an optical scan system is provided. The optical system includes a light source and a prism mirror, wherein the light source is configured to project a light beam that reflects from the prism mirror, and the prism mirror varies the width of the light beam according to the angle of incidence with the prism mirror. The system may further include a relay system to direct the reflected light beam to a reference plane, where the light beam is directed to the reference plane according to the relative width of the light beam.

Various aspects and examples of the present inventions are better understood upon consideration of the detailed description below in conjunction with the accompanying drawings and claims.

DETAILED DESCRIPTION

Described are various exemplary optical methods and systems that vary the width of a light beam as the obliquity of the light beam upon a reference plane increases. The following description is presented to enable any person of ordinary skill in the art to make and use the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

When a beam of light strikes a surface from varying angles, the area (i.e., the footprint) exposed by the beam depends on the width of the beam and the incidence angle (the "obliquity") of the beam with respect to the surface. The greater the obliquity of the beam of light, the greater the surface area exposed by the beam. Further, the wider the beam of light, the greater the surface area exposed by the beam. Accordingly, by decreasing the width of a beam of light as the obliquity increases, the surface area exposed by a beam of light can be maintained relatively constant over varying angles of incidence. Further, in one example, the beams illuminate substantially the same area of the surface from varying angles.

The disclosed optical methods and systems may be used for a variety of applications where a surface is illuminated with a beam of light such as laser processing, material property measurements, and the like. In one example, the disclosed optical systems and methods are advantageously used in holographic data storage systems. It should be recognized, however, that the description is not limited to holographic storage systems and the exemplary optical systems and methods can be equally employed with other optical applications. Thus, holographic data storage systems are but one of many possible illustrative applications of the disclosed methods and systems of obliquity correction.

In one exemplary aspect, optical systems and methods are provided wherein a prismatic mirror is used to control the size (e.g., the width or diameter) of a light beam as a function of the angle of incidence to a reference plane, e.g., associated with a surface or layer. A prismatic mirror, referred to herein as a prism mirror, includes a second surface mirror wherein the front surface of the mirror is in a nonparallel relationship with the mirror surface.

Figure 1:
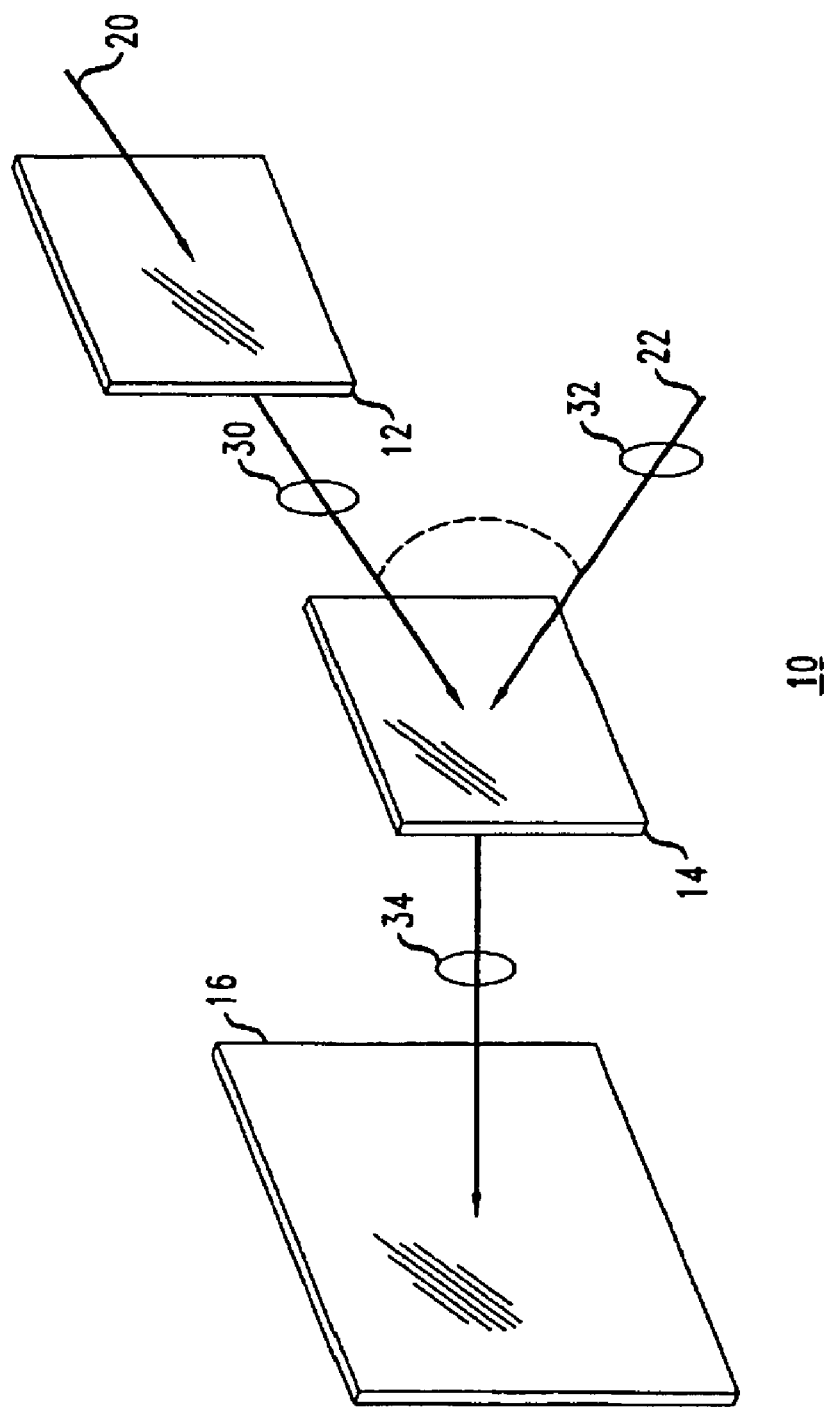
FIG. 1 illustrates an exemplary holographic data storage and retrieval system.
Figure 2:
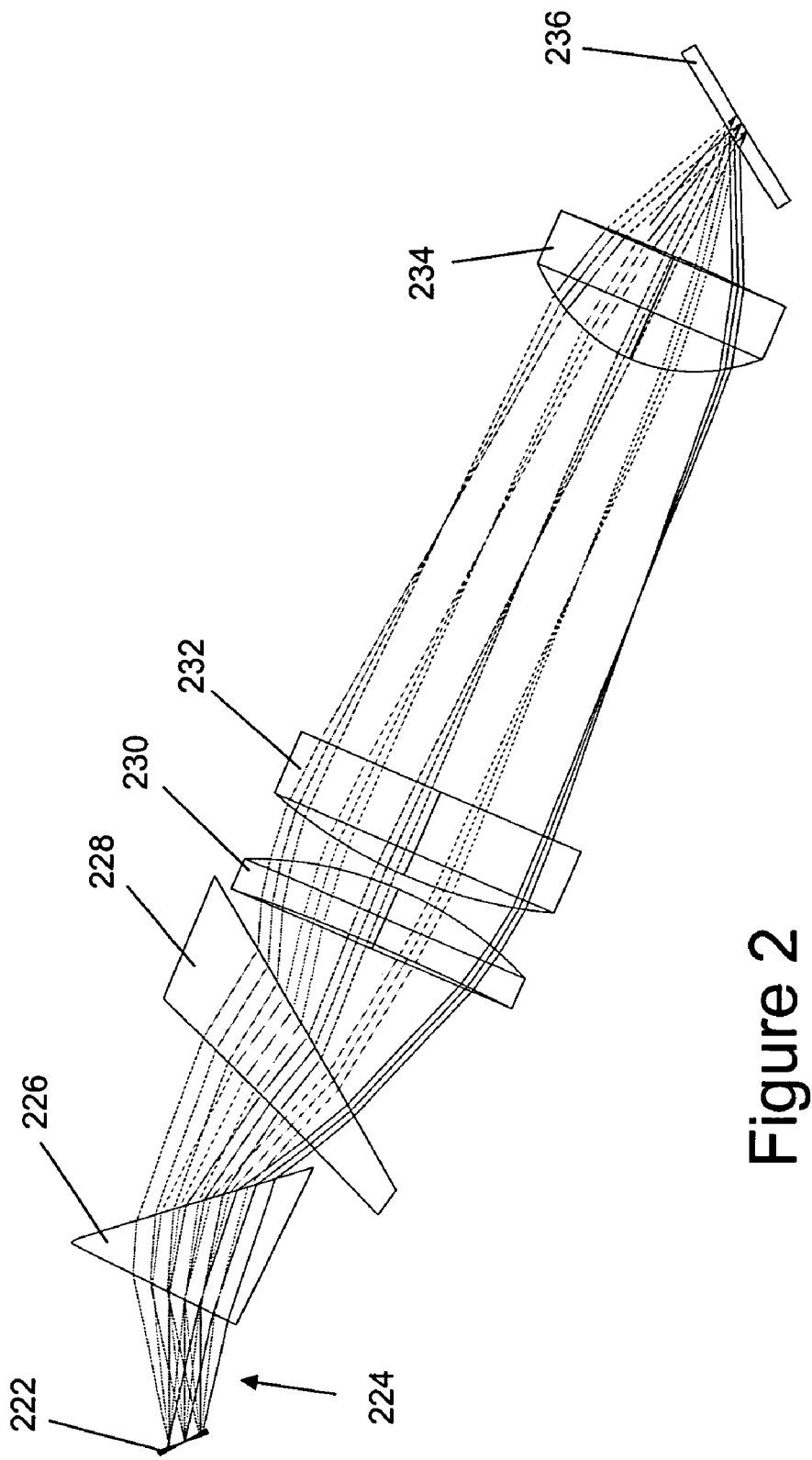
FIG. 2 illustrates an exemplary obliquity correction system.
Figure 3A:
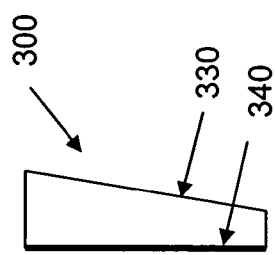
FIG. 3A illustrates an exemplary prism (or "prismatic") mirror.

FIG. 3A illustrates a cross-sectional view of an exemplary prism mirror 300. Prism mirror 300 may advantageously be included in various optical systems, e.g., a holographic data storage system, to vary the width of light beams as a function of an angle of incidence with a reference plane, e.g., associated with a holographic storage medium or the like.

As shown, prism mirror 300 includes a front surface 330 in a nonparallel relationship with a mirror surface 340. Prism mirror 300 varies the width of light beams incident to prism mirror 300. In particular, prism mirror 300 varies the width of light beams according to the angle of incidence of the light beams to prism mirror 300 through first order beam compression of the prism, i.e., the prism formed by the nonparallel relationship between the mirror surface 340 and the front surface 330, combined with the mirror surface 340. Depending on the particular application and system, prism mirror 300 may increase or decrease the width of reflected light beams.

Prism mirror 300 may include any suitable transparent material (at least transparent to the particular wavelength(s) used), e.g., glass, plastic, etc., and any suitable reflective material to form mirror surface 340. In one example, relatively high index glass material, e.g., 1.75 to 1.9 or higher, is used with anti-reflection coating. In other examples, low index glass may be used having lower weight. Additionally, the dimensions of prism mirror 300 may vary depending on the particular application, desired beam compression, and the like.

Figure 3B:
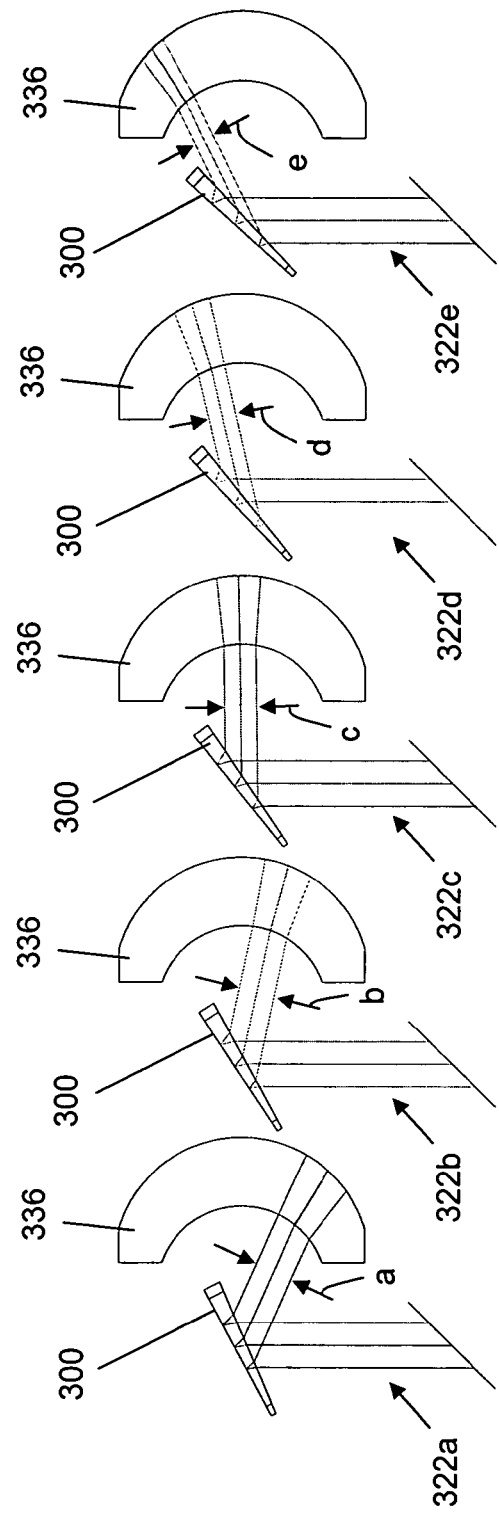
FIG. 3B illustrates beam compression at various incident angles with an exemplary prism mirror.

FIG. 3B illustrates the compression of various beams 322a–e incident upon prism mirror 300 as the angle with respect to prism mirror 300 is varied. In this instance, the beam width is varied by rotating prism mirror 300 with respect to beams 322a–e. In other examples, prism mirror 300 may be stationary and light beams 322a–e incident from various angles. As the angle of incidence with prism mirror 300 varies, the reflected beam width is compressed, e.g., compare width "a" of reflected beam 322a with the compressed width "e" of reflected beam 322e. As the angle of incidence increases from normal, the width of reflected beams 322a–e decreases. In this example, the light beams 322a–e produce a diverging scan; accordingly, the reflected beams 322a–e may be further directed by an optical relay system, e.g., including lens 336, to a desired location associated with a reference plane. In other examples including a moving prism mirror, scanning light beams may converge over a range of scan angles and additional optical elements may be unnecessary.

Figure 4:
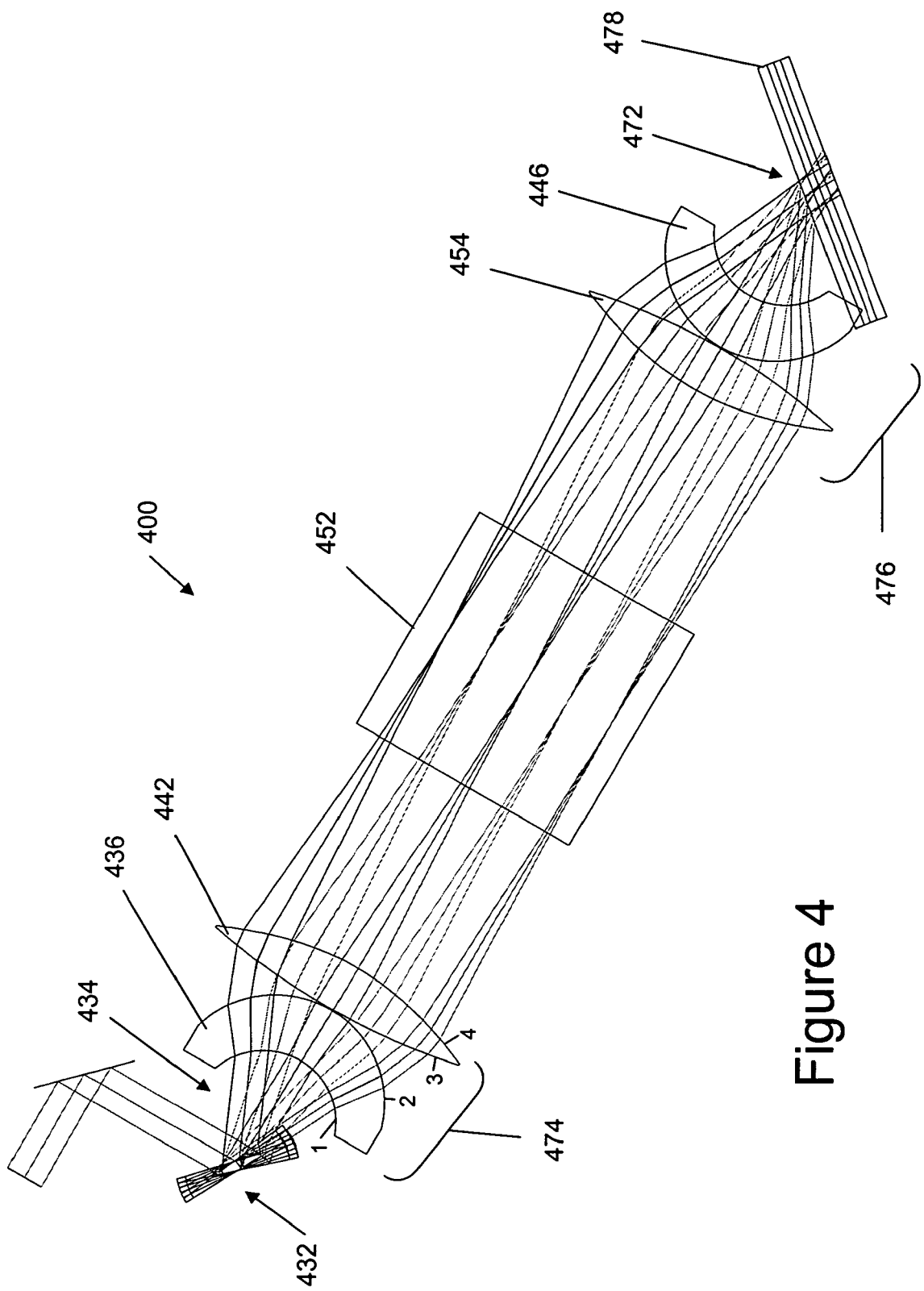
FIG. 4 illustrates an exemplary obliquity correction system including a prism mirror and aspheric scan lenses.

Accordingly, exemplary obliquity correction optical systems and associated methods may vary the width of light beams with a prism mirror and direct light beams of varying width and incidence angles to a reference plane. FIG. 4 illustrates an exemplary optical system 400 that includes a prism mirror 432 and an aspheric scan lens system. The various exemplary optical systems described, including optical system 400, will be described generally with respect to a holographic data storage system, and more specifically, with respect to methods for varying the width of a reference beam as the angle of incidence with a reference plane associated with a holographic storage medium is varied to achieve, e.g., angle multiplexing. It will be recognized by those of ordinary skill in the art, however, that the exemplary optical system may be used in a variety of other optical applications.

Light beams 434 are directed to prism mirror 432, e.g., by steering mirrors or the like, and reflected from prism mirror 432 towards relay optics. In one example, light beams 434 include a collimated light at a wavelength of 405 nm. Light beams 434 are shown incident to prism mirror 432 at five different angles, corresponding to five different scan angles, to illustrate varying beam widths at varying angles with respect to prism mirror 432 and holographic storage medium 478. In one example, light beams 434 are scanned over a 50 degree angle, and the input light beam diameter is 5.0 mm.

As illustrated in FIG. 4 (and discussed above with regard to FIG. 3A) prism mirror 432 compresses or varies the width of beams 434 based on the angle of incidence with prism mirror 432. Light beams 434 exiting prism mirror 432 with varying sized widths for different scan angles proceed through a relay system, in this example, including lenses 436, 442, 454, and 446, and are relayed to a hologram location 472. The relay optics are configured to direct the beams reflected from prism mirror 432 to a substantially common location of a reference plane associated with storage medium 478 according to the angle of incidence with the reference plane. For example, as the angle increases from normal to the reference plane, the beam width narrows. As illustrated in FIG. 4, the widest beam is incident medium 478 near normal and the narrowest beam is incident medium 478 at a more oblique angle.

Lenses 436, 442, 454, and 446 comprise a relay configuration known commonly as a "4F scanner," wherein the distance from prism mirror 432 to the illuminated area or hologram location 472 is approximately four times F, the focal length of the lens arrangement. It will be recognized by those of ordinary skill in the art that various other optical relay systems may be employed, including prisms, beam splitters, optical filters, and the like.

Lens elements 474 receive collimated light beams 434 at different angles, pivoting about a fixed point near prism mirror 432. The first group of lens elements 474 converts light beams 434 into converging light, with the central rays of each converging beam being approximately parallel to the optical axis. In particular, aspheric lens 426 steers light beams 436 to lens 442, which creates converging light beams. Aspheric lenses may allow for relatively larger scan angle range, larger beam diameter, good wavefront quality, compact size, and low cost, compared to non-aspheric lenses; however, in other examples, non-aspheric lenses may be used.

Light beams 434 then travel a distance beyond a focal point and begin to diverge, but with the central rays still essentially parallel to the axis. The second lens group 476 receives these light beams 434 and converts them into approximately collimated light. In particular, lens 454 creates substantially collimated light beams and aspheric lens 446, in this example, similar to aspheric lens 436, directs the central rays of light beams 434 (that is, each beam during the scan) toward a common hologram location 472. Additionally, the output is a telecentric scan of converging beams.

In one example, the optical lens elements 474 and 476 include the same aspheric lens elements to produce a scanning collimated beam. The following table includes optical information regarding surfaces 1, 2, 3, and 4 of aspheric lens 436 and lens 442 for an exemplary input lens configuration with a collimated 405 nm light beam having a diameter of 5.0 mm:

| Surface | Radius (mm) | Thickness (mm) | Glass | Diameter (mm) |
|---|---|---|---|---|
| 1 | −10.7357 | 10.3423 | LAH65 | 32.00 |
| 2 | −16.6572 | 0.2 | LAH65 | 32.00 |
| 3 | 53.1626 | 7.00 | LAH65 | 32.00 |
| 4 | −58.0147 | . . . | LAH65 | 32.00 |

Aspheric data, surface 4: Conic constant=4.61925400E-03, Coefficient on r4=5.0503318000E-06, Coefficient on r6=−6.0933444000E-10, Coefficient on r8=−5.4125886000E-14.

The above table is illustrative only and various other lens components and dimensions may be advantageously used. For example, other exemplary lens systems are described in U.S. patent application Ser. No. 10/246,737, entitled "Holographic Storage Lenses," incorporated by reference in its entirety.

Beams 434 incident on holographic storage medium 478 near normal to holographic storage medium 478 are wider than those beams 434 varying from normal to surface 478. In one example, the area of hologram location 472 is substantially uniform at a reference plane within holographic storage medium 478 over the varying angles of incidence. Further, in one example, each beam 434 illuminates approximately the same location of the reference plane, e.g., hologram location 472. It should be recognized that the reference plane may be located on a surface of holographic storage medium 478, behind the surface (e.g., within the holographic storage medium 478), or in front of the surface of holographic storage medium 478. For example, often a holographic medium includes a protective layer or substrate over a holographic material layer.

In the obliquity correction system 400, prism mirror 432 and hologram location 472 are positioned substantially on the optical axes of lens pairs 474 and 476. In other examples, prism mirror 432 and hologram location 472 may be moved away from the optical axis. One exemplary system that includes an off-axis arrangement is described in U.S. patent application Ser. No. 10/211,300, entitled "Obliquity Correction System," which is disclosed herein by reference in its entirety.

Those of ordinary skill in the art will recognize that various other optical systems including prism mirror 432 may be used to vary the width of beams 434 as the angle of incidence to a reference plane is varied. The examples herein are illustrative only, and various optical elements may be included or omitted from the exemplary optical system 400. For instance, beam splitter cube 452 may be included in the optical system to add or remove light, e.g., to read and/or write a servo signal for a read and/or write application. Further, the exemplary optical systems may be used in holographic read only systems, write only systems, or read and write systems. Accordingly, additional devices such as spatial light modulators, detectors, and the like may be included.

In one exemplary holographic write data storage system, a data beam is incident holographic storage medium 478 at hologram location 472, e.g., from a direction along arrow 472. A detector may be placed behind or below holographic storage medium 478 in a read system to detect stored data read out by light beams 432. Exemplary systems may also include a phase conjugate readout system including, e.g., a separate readout scanner illuminating holographic storage medium 478 from below to retrieve stored data. Various other read and/or write systems are possible and contemplated depending on the particular application and design.

In the present exemplary optical system and method, a prism mirror is used in conjunction with a relay system having curved optics (e.g., lenses 436 and 446) to vary the width of the beam over varying angles of incidence with a reference plane. In another exemplary optical system and method, a prism mirror is used alone or optionally with an optical relay system including a prism to vary the width of light beams over varying angles of incidence with a reference plane without the need for curved optical elements, e.g., lenses. Exemplary advantages of using one or more prisms, without curved optics, include that the cost of the system may be reduced and the wavefront quality of the scanned beams increased. For example, a prism mirror used alone or with one or more prisms includes flat surfaces that control and vary the beam width while generally maintaining initial wavefront qualities. Exemplary advantages of having a prism mirror and curved relay optics, however, include that the moving part(s), e.g., prism mirror and/or scanning mirror, can generally be made smaller, which may benefit the speed and cost of the system.

Figure 5:
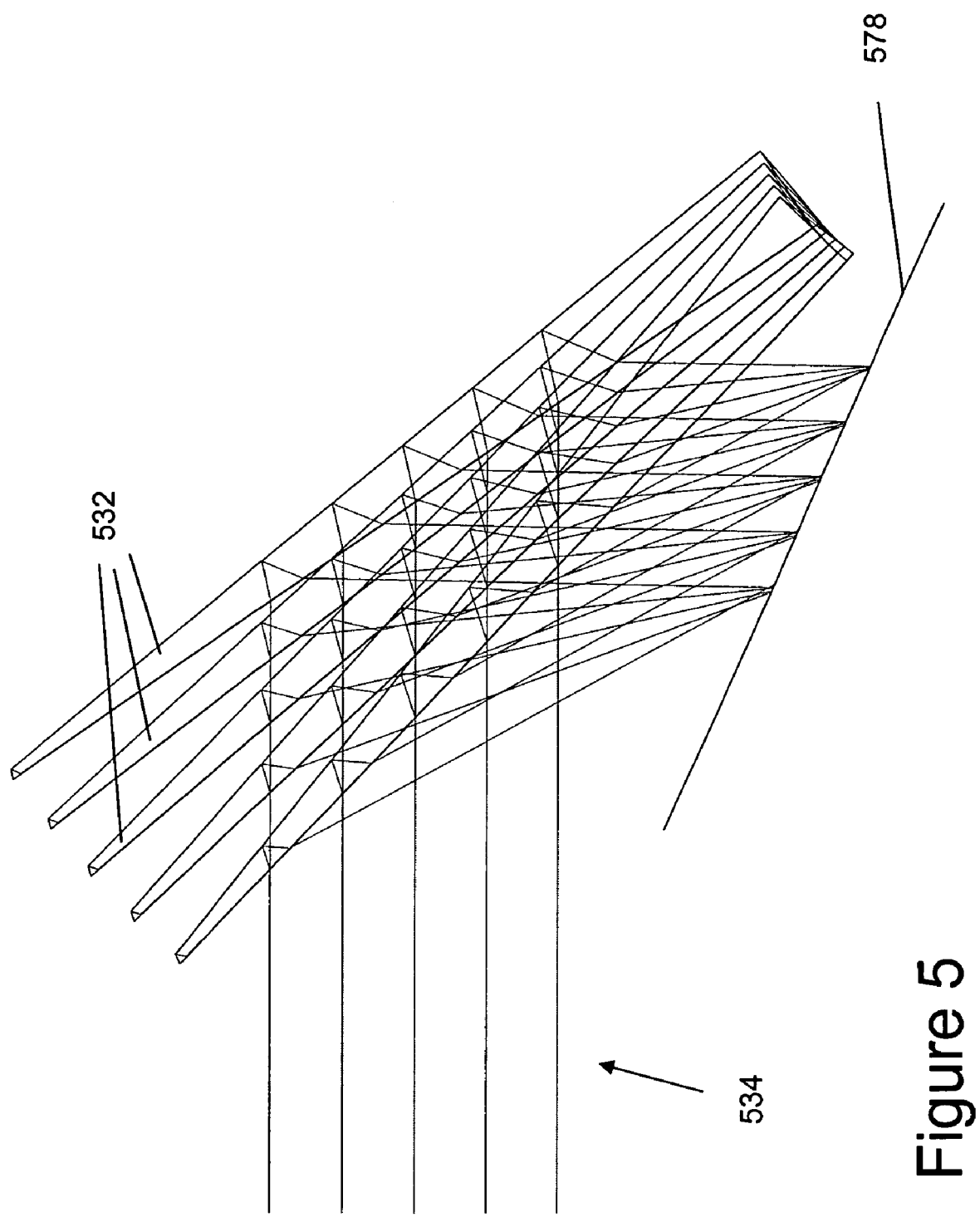
FIG. 5 illustrates an exemplary obliquity correction system including a moving prism mirror.

FIG. 5 illustrates an exemplary optical system having a moving prism mirror 532 at various angles to vary the width of light beams 534 according to varying scan angles incident to reference plane 578. The exemplary optical system may advantageously be used without curved optics or additional relay optics such as prisms or lenses. In operation, prism mirror 532 is moved to reflect light beams 534 with varying widths toward reference plane 578. As described previously, the width of reflected light beams 534 will depend on the angle of incidence of light beams 534 with prism mirror 532. It will be noticed that prism mirror 532 is rotated about a pivot point offset from the prism to produce a converging, obliquity corrected scan with respect to reference plane 578. In other examples prism mirror 532 may be translated and/or rotated in various ways to reflect varying width light beams to a reference plane.

Figure 6:
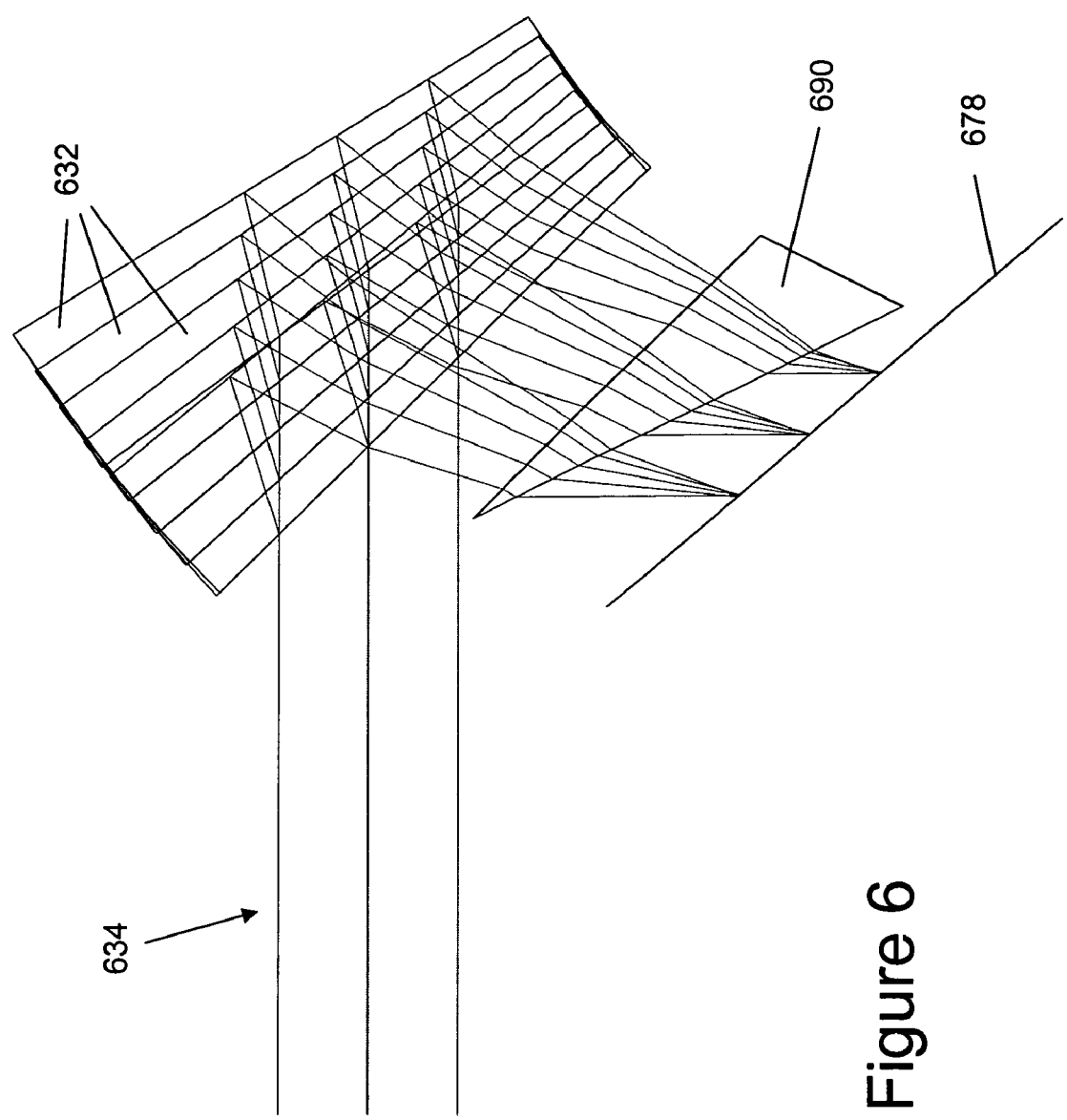
FIG. 6 illustrates an exemplary obliquity correction system including a moving prism mirror and a static prism.

FIG. 6 illustrates another exemplary optical system having a moving prism mirror 632 and prism 690 to vary the width of light beams 634 with varying angles of incidence to a reference plane or surface. The exemplary optical system may advantageously be used without lenses; however, in other systems and applications, curved optics may be used. In operation, prism mirror 632 is rotated around a pivot point offset from prism mirror 632 and reflects light beams 634 with varying widths to prism 690. In this example, prism 690 is static (i.e., it does not move), however, it is contemplated that in other exemplary systems prism 690 may translate and/or rotate in addition to prism mirror 632.

As described previously, the width of reflected light beams 634 will depend on the angle of incidence of light beams 634 with prism mirror 632. Each light beam 634 is reflected by prism mirror 632 and passes through static prism 690. Static prism 690 directs light beams 634 of varying widths reflected from prism mirror 632 to a substantially common location at reference plane 678 from various angles of incidence.

Reference plane 578 and 678 of the previous examples may be associated with a holographic data storage medium. It is noted that an exact location and size of light beams 534 and 634 incident to reference plane 578 and 678 from different incident angles is not required and may depend on the particular application, thickness of the storage medium, and the like.

As described throughout the present description, the various exemplary optical systems and methods are advantageously employed in a holographic data storage system. In a holographic data storage and/or retrieval system, an optical system directs and shapes coherent optical beams to intersect at a surface or volume where the interference pattern is recorded and/or directs a single beam to a surface or volume to retrieve or read a stored interference pattern. To store (and/or retrieve) a large number of data pages or images within the same storage medium volume angle multiplexing may be used, where the angle of the reference beam is varied for each data page. Generally, a wide range of incident angles increases the data storage capacity of the storage medium. In one example, the angle of the incident reference beam from normal of a region of the medium ranges from about 20 degrees to about 50 degrees. In another example, the angle of the incident reference beam is from about 10 degrees to about 60 degrees, and in yet another example, the angle of the incident of the reference beam is from about 10 degrees to 70 degrees.

In one example, the change in width of the beam, as the angle of incidence to the storage medium changes, is such that the illuminated area remains substantially constant. For thin media, this means that the width of the beam is proportional to the cosine of the incidence angle. A thin storage medium is, e.g., a storage medium that has a thickness less than about 30% of the diameter of the illuminating beam.

For example, if the system includes normal incidence, and if the beam width for normal/perpendicular incidence is defined to be 1 unit, then the following factors could be supplies to the beam width as the angle changes for thin media:

| Incidence angle (degrees from normal) | cosine (width change factor) |
|---|---|
| 0 | 1.000 |
| 10 | 0.985 |
| 20 | 0.940 |
| 30 | 0.866 |
| 40 | 0.766 |
| 50 | 0.643 |
| 60 | 0.500 |
| 70 | 0.342 |

For example, a beam that is 10 degrees from normal would have a thickness of about 0.985 units.

If the system does not include normal incidence, then the correct change factor at a given angle can be determined as the ratio of the cosines of different beam angles; for example: cosine(given angle)/cosine(smallest angle used). An example is a system that covers 10 to 60 degrees, for which the following factors would be applied to the beam width as the angle changes:

| Incidence angle (degrees from normal) | cosine ratio (width change factor) |
|---|---|
| 10 | 1.000 |
| 20 | 0.954 |
| 30 | 0.879 |
| 40 | 0.778 |
| 50 | 0.653 |
| 60 | 0.508 |

Additionally, the optical system desirably minimizes the distortion of the reference beam produced by the optical system including, e.g., a prism mirror and optical relay system. Distortion can be quantified in terms of peak-to-valley wavefront error measured in wavelengths of the transmitted light. Limiting the distortion of the reference beam passing through the optical system is desired for at least two reasons. First, distortion of the wavefront can decrease the quality of the image produced by the optical system. In a holographic data storage system, for example, distortion of the reference bean can decrease the quality of the interference pattern produced by the storage system.

Second, minimizing the distortion of the wavefront generally increases the ability for creating a reproducible beam of light. In a holographic data storage system, for example, a reproducible reference beam is generally desirable because a reference beam that is the same or similar to the reference beam used to create the interference pattern is typically used to reproduce the data beam from the interference pattern during the readout process. Accordingly, any distortion of the reference beam due to the optical system is desirably reproducible. By minimizing the amount of distortion, reproducibility of the reference beam is typically improved.

In one example, the wavefront error of the reference beam is less than 20 waves, in another example, less than 10 waves, and in yet another example, less than 0.25 waves. Distortion greater than these exemplary values is still useful in a holographic data storage system because the reference beam errors can be corrected, at least to some extent, during the readout process using a reference beam with the same or similar distortion.

In one example, the optical system does not shift the position of a beam of light passing through the optical system. In a holographic data storage system, a shift in position of the beam of light entering the optical system can cause unintended areas of the holographic storage medium to be illuminated, thereby reducing data storage capacity. To avoid this, the system desirably prevents the beam from shifting position while its width and/or angle are adjusted. For example, in the above example illustrated in FIG. 6, prism 690 may be positioned to reduce shift.

For a thin storage medium the optical system can be designed to constrain the edge rays and limit or reduce lateral motion on the media surface while the beam angle changes. By constraining the edge rays in this manner, a substantially constant area can be illuminated over a range of angles.

For a thick storage medium, for example, a storage medium with a thickness greater than about 30% of the diameter of the illuminating beam, maintaining the position of the beam is typically more complicated. In particular, maintaining the position of the beam and preventing the reference beam from illuminating at least some areas of the storage medium where the data beam is not present is difficult. The areas illuminated by the reference beam where the data beam is not present may be minimized by finding the maximum medium volume illuminated by the data beam, and minimizing the size of the reference beam while still overlapping the data beam. In practice this is similar to what is generally done for a thin storage medium, however, the points where the edge rays are constrained to reduce lateral shift occur on opposite sides (i.e., front and back) of the storage medium.

The above description and examples are presented to enable a person of ordinary skill in the art to make and use the invention. Various modifications to the examples will be readily apparent to those skilled in the art, and the generic principles defined herein may be applied to other examples and applications without departing from the spirit and scope of the invention. Throughout this description, particular examples have been discussed and how these examples are thought to address certain disadvantages in related art. This discussion is not meant, however, to restrict the various examples to methods and/or systems that actually address or solve the disadvantages. Further, particular examples have been discussed with regard to holographic data storage systems, however, it should be recognized, that the exemplary optical systems and methods may be used in a variety of unmentioned optical systems and applications. Thus, this invention is not intended to be limited to the examples shown and described, but is to be accorded the widest scope consistent with the principles and features disclosed herein.

What is claimed is:

1. A method of obliquity correction in an optical system, comprising:
    directing a light beam to a mirror comprising a prismatic, second surface mirror; and directing a reflected light beam from the mirror to a reference plane with an angle of incidence to the reference plane, the mirror movable for varying the width of the reflected light beam according to the angle of incidence to the reference plane such that the width is narrowed as the angle of incidence to the reference plane increases from normal.

2. The method of claim 1, wherein the reference plane is associated with a surface.

3. The method of claim 1, wherein the reference plane is associated with a holographic storage medium.

4. The method of claim 1, wherein the mirror is rotated to vary the width of the light beam.

5. The method of claim 1, wherein the light beam incident on the mirror is relayed to the reference plane via an optical lens system including at least one lens.

6. The method of claim 5, wherein the optical lens system includes at least one aspherical lens.

7. The method of claim 1, wherein the light beam incident on the mirror is relayed to the reference plane via a prism.

8. A method for scanning multiple light beams to a reference plane, comprising:
   directing a first light beam to a mirror at a first angle to the mirror, wherein the mirror comprises a prismatic, second surface mirror; and
   directing a second light beam to the mirror at a second angle to the mirror, wherein
      the width of the first light beam and the second light beam are varied by the prism mirror according to the first angle and the second angle to the prism mirror,
      the first light beam is reflected from the mirror to a reference plane at a first angle of incidence relative to normal of the reference plane,
      the second light beam is reflected from the mirror to the reference plane at a second angle of incidence relative to normal, the second angle of incidence larger than the first angle of incidence, and
      the width of the second light beam is less than the width of the first light beam.

9. The method of claim 8, wherein the mirror varies the width of the first light beam and the second light beam such that an area of intersection of the first light beam and the second light beam with the reference plane are substantially equal.

10. The method of claim 8, wherein the first light beam and the second light beam are directed to the same location of the reference plane.

11. The method of claim 8, wherein the reference plane is associated with a surface.

12. The method of claim 8, wherein the reference plane is associated with a holographic storage medium.

13. The method of claim 8, wherein the mirror is rotated to vary the width of the first light beam and the second light beam.

14. A holographic data storage system, comprising:
   a light source; and
   a mirror, the mirror comprising a prismatic, second surface mirror, wherein
   the light source is configured to project a light beam that reflects from the mirror and is incident to a reference plane, and
   the mirror decreases the width of the light beam as the angle of incidence to the reference plane from normal increases.

15. The holographic data storage system of claim 14, wherein the reference plane is associated with a holographic storage, medium.

16. The holographic data storage system of claim 14, wherein the mirror rotates to vary the width of the light beam reflecting therefrom.

17. The holographic data storage system of claim 14, further including a sensor configured to detect the light beam after the light beam is incident to the reference plane.

18. The holographic data storage system of claim 17, wherein the sensor is positioned to detect light that passes through the reference plane.

19. The holographic data storage system of claim 17, wherein the sensor is positioned to detect light that reflects from the reference plane.

20. The holographic data storage system of claim 14, further including an object beam encoded with data to be stored in a holographic storage medium, wherein the object beam and the light beam interfere at the reference plane.

21. The holographic data storage system of claim 14, further including an optical relay system having a prism.

22. The holographic storage system of claim 14, further including an optical relay system including a curved lens.

23. An optical scanning system, comprising:
   a light source; and
   a mirror, the mirror comprising a prismatic, second surface mirror, wherein
   the light source is configured to project a light beam that reflects from the prism mirror, the reflected light beam incident a reference plane, and
   the mirror is operable to rotate and decrease the width of the light beam reflected from the mirror as the angle of incidence to the reference plane from normal increases.

24. The system of claim 23, wherein the system further includes a relay system to direct the reflected light beam to the reference plane, and the light beam width varies with incident angle to the reference plane.

25. The system of claim 23, wherein the mirror is rotated to vary the beam width.

26. The system of claim 23, wherein the reference plane is associated with a holographic storage medium.

* * * * *